United States Patent
Chien et al.

(10) Patent No.: US 8,752,893 B2
(45) Date of Patent: Jun. 17, 2014

(54) ADJUSTING METHOD AND STRUCTURE FOR SEAT POST OF BICYCLE

(71) Applicant: Durashox Technology Co., Ltd., Taichung (TW)

(72) Inventors: Katsu-Hiko Chien, Taichung (TW); Yan-Ting Wu, Chiayi (TW)

(73) Assignee: Durashox Technology Co., Ltd., Taichung (TW)

( * ) Notice: Subject to any disclaimer, the term of this patent is extended or adjusted under 35 U.S.C. 154(b) by 116 days.

(21) Appl. No.: 13/657,084

(22) Filed: Oct. 22, 2012

(65) Prior Publication Data

US 2014/0021753 A1    Jan. 23, 2014

(30) Foreign Application Priority Data

Jul. 23, 2012  (TW) .............................. 101126488 A

(51) Int. Cl.
*B62J 1/00* (2006.01)
(52) U.S. Cl.
USPC ....................... 297/215.13; 248/157; 267/132
(58) Field of Classification Search
USPC ........... 248/579, 125.2, 132, 404, 157, 354.1; 267/131, 132; 297/215.13
See application file for complete search history.

(56) References Cited

U.S. PATENT DOCUMENTS

| | | | | |
|---|---|---|---|---|
| 1,657,179 | A * | 1/1928 | Reinsperg | 248/404 |
| 6,581,919 | B2 * | 6/2003 | Barefoot et al. | 267/132 |
| 7,621,490 | B2 * | 11/2009 | Tseng | 248/157 |
| 8,308,124 | B2 * | 11/2012 | Hsu | 248/599 |
| 8,328,454 | B2 * | 12/2012 | McAndrews et al. | 403/109.7 |
| 8,342,465 | B2 * | 1/2013 | Koder | 248/188.5 |
| 8,398,104 | B2 * | 3/2013 | Hsu | 280/220 |
| 8,511,655 | B2 * | 8/2013 | Wu | 267/132 |
| 2012/0006949 | A1 * | 1/2012 | Laird et al. | 248/161 |

* cited by examiner

*Primary Examiner* — Bradley Duckworth
(74) *Attorney, Agent, or Firm* — CKC & Partners Co., Ltd.

(57) ABSTRACT

An adjusting method and a structure for a seat post of a bicycle are provided. The structure of the seat post includes an adjusting tube, four pulleys, a pushing member, a main tube, an elastic member, and a cord. The adjusting tube is coaxially movably disposed in the main tube, while the pushing member is coaxially movably disposed in the adjusting tube and coaxially fixed with the main tube. One of the pulleys is pivotally disposed in the adjusting tube, and the other pulleys are pivotally disposed in the pushing member. Two of the pulleys inside the pushing member are movable along the pushing member. The cord is wound around the four pulleys. The elastic member is disposed in the pushing member and can push the pulleys to move. Pulleys moving along the pushing member push the adjusting tube moving outwardly form the main tube.

10 Claims, 7 Drawing Sheets

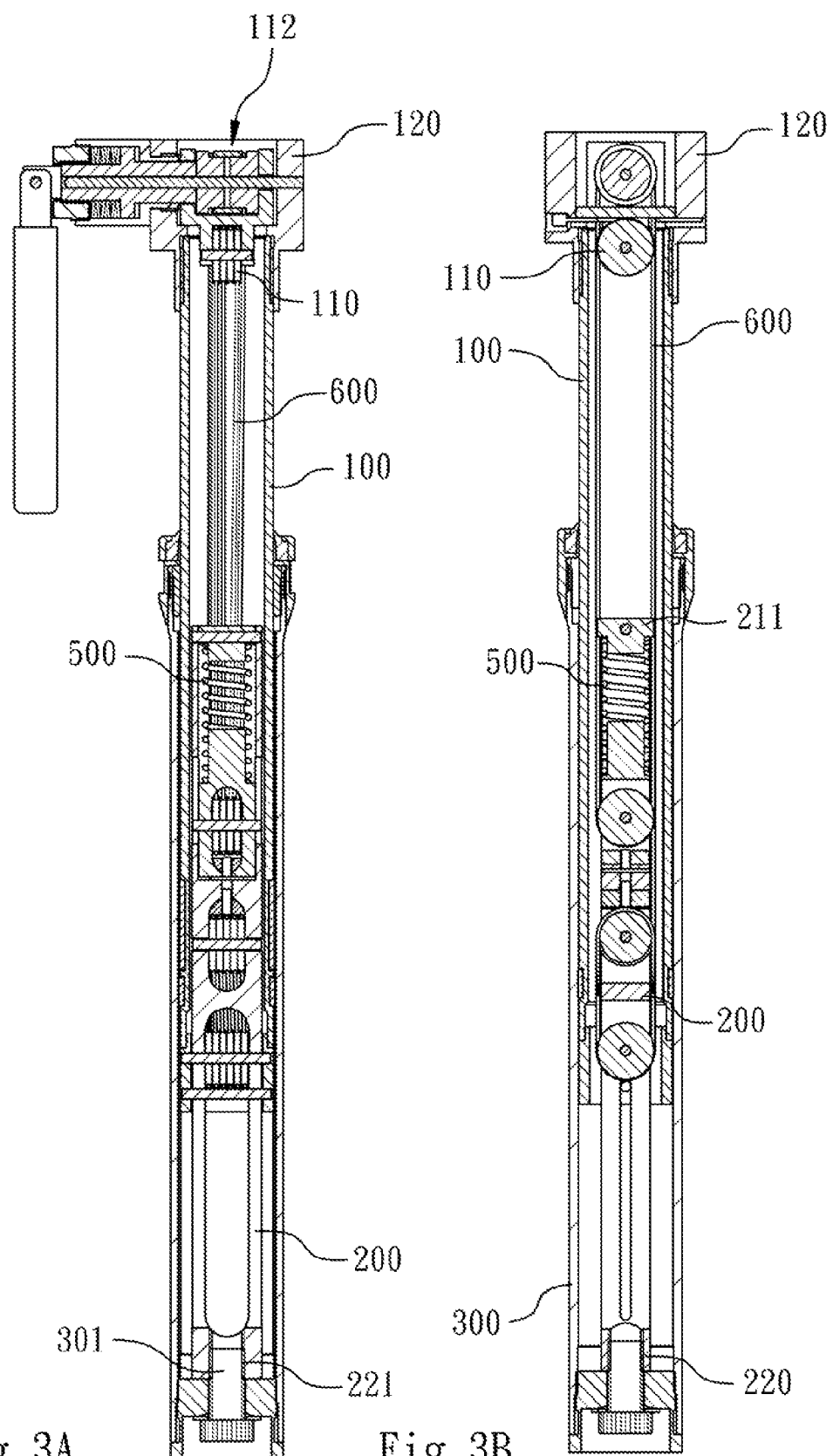

ADJUSTING METHOD AND STRUCTURE FOR SEAT POST OF BICYCLE

RELATED APPLICATIONS

This application claims priority to Taiwan Application Serial Number 101126488, filed Jul. 2, 2012, which is herein incorporated by reference.

BACKGROUND

1. Field of Disclosure

The present disclosure relates to a seat post of a bicycle. More particularly, the present disclosure relates to a structure and an adjusting method for a seat post of a bicycle.

2. Description of Related Art

When choosing a bicycle, to ensure that the riding position is comfortable and to prevent injuries, it is important that the bicycle height fits to the rider. The saddle height is especially important, since the saddle height is the key factor in adjusting riding position. Though customizing every bicycle for every rider is extremely expensive, so most bicycles nowadays offer an adjustable saddle height through adjusting the insertion amount of the seat post in the seat tube of the bicycle frame.

But it requires the rider to get off the saddle so that the insertion amount of the seat post can be adjusted. This adjusting can be time consuming and especially inconvenient for riders who need an instant adjusting during a ride when facing descending or climbing. Therefore, various adjusting structures within seat posts to adjust the seat post length have been proposed and enable riders to adjust the saddle height through adjusting seat post length without getting off the saddle. There are two major types of the adjusting structures. One is hydraulic type, which uses oil or air flow to create pressure to adjust the seat post length. Another is hybrid type, which adopts hydraulic and mechanic mechanism at the same time, but still using hydraulic flow as the main mechanism to adjust the seat post length. So both types rely on the sealing of oil or air, but the perfect sealing is highly demanding and costly. Furthermore, when the oil or air flew fast within the mechanism, there can be air bubbles occurred, and bubbles make the adjusting structure functioning slow.

SUMMARY

A seat post of a bicycle is provided. According to one embodiment of the present disclosure, the seat post comprises an adjusting tube, a first pulley, a pushing member, a main tube, an adjusting mechanism, an elastic member, and a cord. The first pulley is pivotally disposed in the adjusting tube. The pushing member has a first end and a second end, in which the first end of the pushing member may be coaxially disposed in the adjusting tube. The main tube is connected to the bicycle, in which the second end of the pushing member may be connected to the main tube, and the adjusting tube is axially movable in the main tube. The adjusting mechanism includes, in order from the first end to the second end of the pushing member, a second pulley, a third pulley, and a fourth pulley. The second pulley is pivotally connected to the pushing member and being axially movable along the pushing member. The third pulley is pivotally connected to the pushing member. The fourth pulley is pivotally and coaxially connected to the pushing member and the adjusting tube. The elastic member is connected to the adjusting mechanism. The cord includes a base segment and a feed segment. The base segment is wound around the first pulley and the second pulley. The feed segment is wound around the third pulley and the fourth pulley. The second end of the pushing member is movable outwardly from the adjusting tube by the elastic member pushing the adjusting mechanism. So the second pulley is axially movable with a base displacement relative to the adjusting tube. And the fourth pulley is axially movable along the pushing member with a feed displacement.

In the foregoing embodiment, through the elastic member and the four pulleys, the relative position of the adjustment tube and the main tube can be adjusted. As a result, the length of the seat post is adjusted. In some embodiments, a number of winding turns of the feed segment may be more than a number of winding turns of the base segment. And the base displacement may be larger than the feed displacement. When the elastic member is pushing the adjusting mechanism and enlarging the base displacement, the adjusting tube is moving against the pushing member. Through the cord and the pulleys, the feed displacement is enlarged accordingly, the enlarge amount depends on the ratio of the number of winding turns of the feed segment and the number of winding turns of the base segment. Since the second end of the pushing member is connected with the main tube, the adjusting tube is extended outwardly from the main tube. The length of the seat post is therefore extended by the feed displacement. If a user doesn't lock the cord in the middle of the extending, the seat post is extended to a predetermined length.

According to another embodiment, a locking mechanism for the foregoing seat post is provided. The foregoing seat post further includes a clamping wheel, a fixing head, a control set, and a resetting means. The clamping wheel can clamp the cord axially, in which two periods of the base segment of the cord running opposite directions are wound around the clamping wheel. And the rest of the base segment of the cord is wound around the first pulley. The clamping wheel further includes a clamping ring, two step wheels, and a pressing member. The clamping ring is pivotally disposed in the fixing head. Each of the step wheels has a smaller first step and a larger second step. The two first steps are disposed oppositely and sleeved inside the clamping ring. And the two periods of the base segment of the cord running opposite directions are deposed between the second steps respectively and the clamping ring. The pressing member can axially move one of the step wheels, so that the second steps and the clamping ring can clamp the cord. And the fixing head is fixed at a top end of the adjusting tube. The control set can move the pressing member with an axial displacement. The resetting means is for resetting the control set to a predetermined location.

An adjusting method for a seat post of a bicycle is also provided, including the following steps. A plurality of pulleys is disposed in a stretchable seat post to produce a base displacement and a feed displacement. At least one of the pulleys is moved correspondently with the seat post. A cord is wound around the plurality of pulleys. A number of winding turns at the feed displacement and a number of winding turns at the base displacement are different. When the cord is applied force and the base displacement is changed, the feed displacement is different from the base displacement, so the seat post is stretched outwardly or inwardly accordingly. An elastic resetting force is applied for resetting the base displacement and resetting the seat post stretching.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 3A is a front cross-sectional view of the seat post assembly of FIG. 1;

FIG. 3B is a side cross-sectional view of the seat post assembly of FIG. 1;

DETAILED DESCRIPTION

Figure 1:
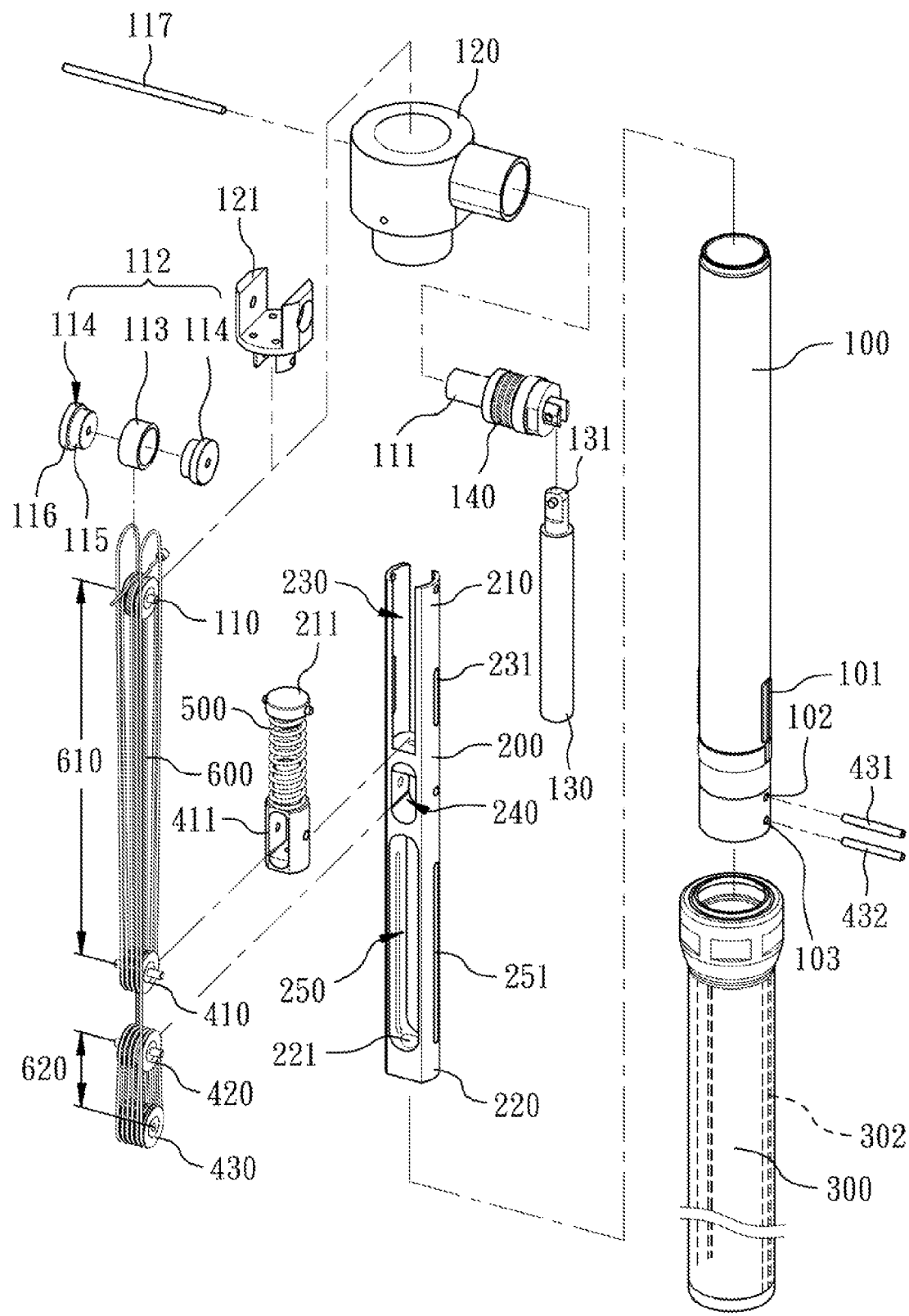
FIG. 1 is an exploded view of a seat post according to one embodiment of the present disclosure, including a pushing member and a fixing head.

Reference will now be made in detail to the present embodiments of the disclosure, examples of which are illustrated in the accompanying drawings. Wherever possible, the same reference numbers are used in the drawings and the description to refer to the same or like parts.

Figure 2:
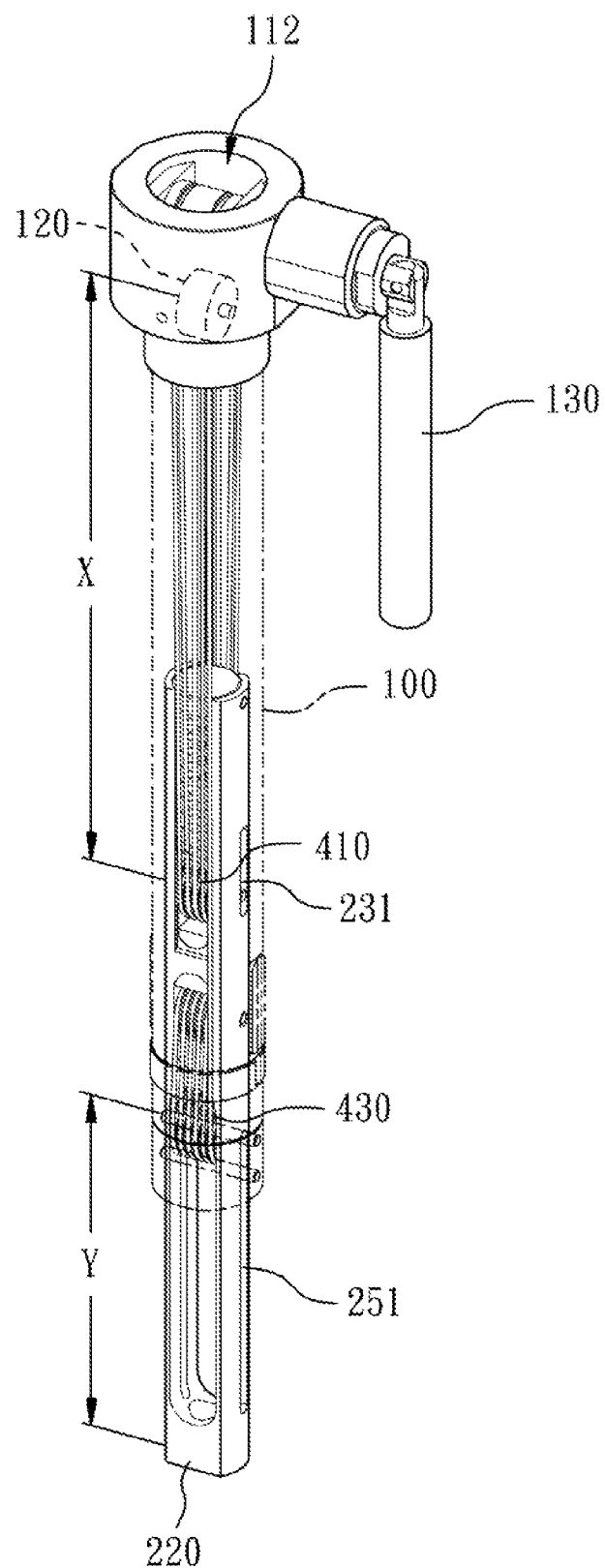
FIG. 2 is an inside perspective view of the pushing member of the seat post of FIG. 1.
Figure 4A:
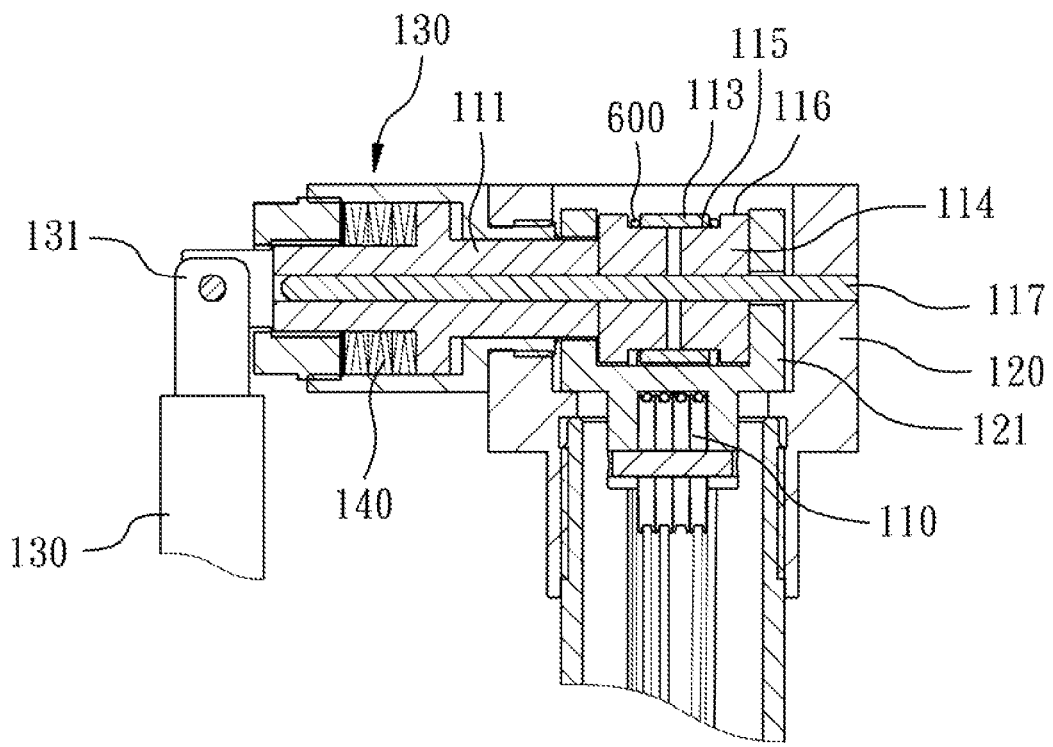
FIG. 4A is a front cross-sectional view of the fixing head assembly of FIG. 1.
Figure 4B:
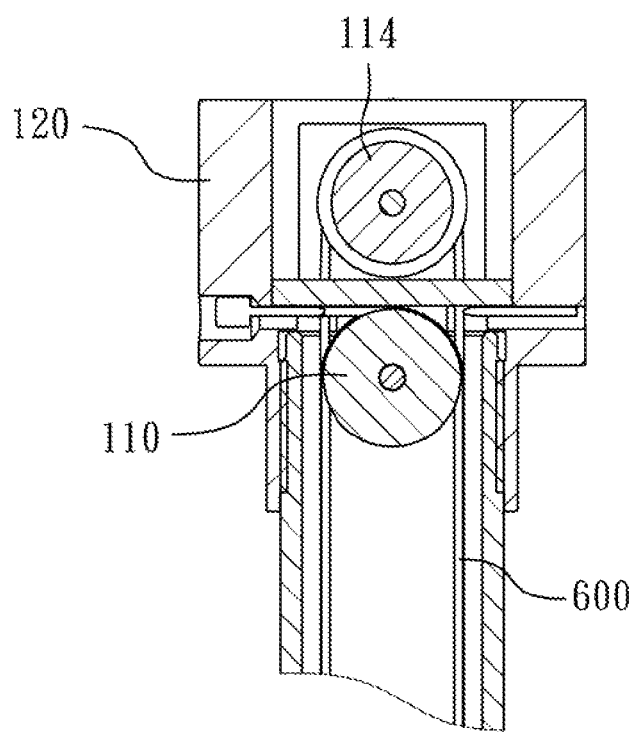
FIG. 4B is a side cross-sectional view of the fixing head assembly of FIG. 1.
Figures 5A, 5B:
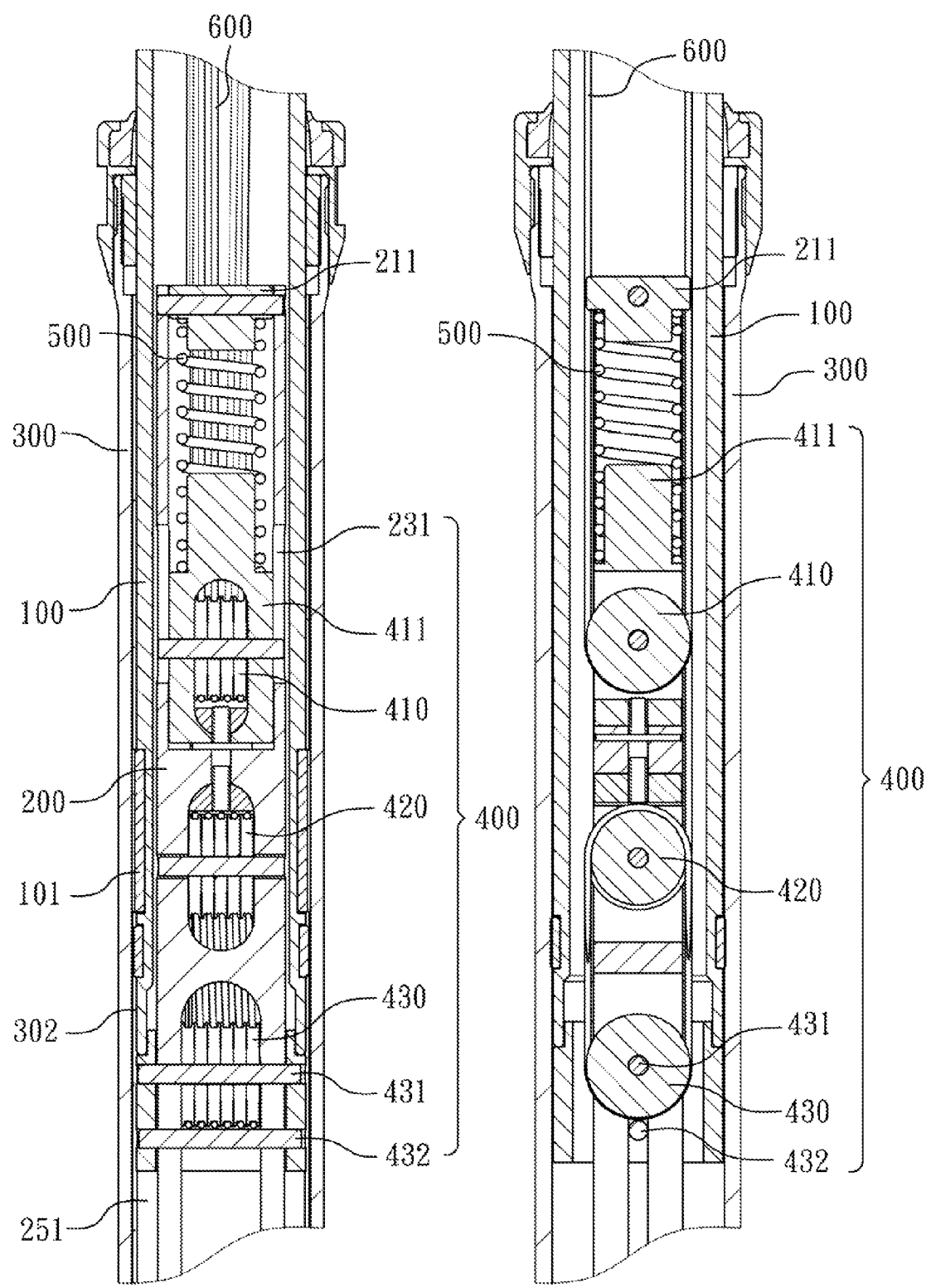
FIG. 5A is a front cross-sectional view of the pushing member assembly of FIG. 1.
FIG. 5B is a side cross-sectional view of the pushing member assembly of FIG. 1.

FIG. 1 is an exploded view of a seat post of a bicycle according to one embodiment of the present disclosure, including a pushing member 200 and a fixing head 120. FIG. 2 is an inside perspective view of the pushing member 200 of the seat post of FIG. 1. Relationships among all elements please refer to FIGS. 3A and 3B, FIG. 3A is a cross-sectional view, and FIG. 3B is a side cross-sectional view of the seat post assembly of FIG. 1. FIG. 4A is a front cross-sectional view, and FIG. 4B is a side cross-sectional view of a fixing head 120 assembly of FIG. 1. FIG. 5A is a front cross-sectional vie and FIG. 5B is a side cross-sectional view of a pushing member 200 assembly of FIG. 1. Please refer to FIG. 1 to FIG. 5B for the following description.

According to the embodiment, the seat post comprises an adjusting tube 100, the pushing member 200 which can be moved along the adjusting tube 100, a main tube 300 which allow the adjusting tube 100 to be moved only along with, an adjusting mechanism 400, an elastic member 500, and a cord 600. The adjusting tube 100 includes a first pulley 110, the fixing head 120, and a control set 130. The first pulley 110 is pivotally disposed in the adjusting tube 100. The fixing head 120 is fixed at a top end of the adjusting tube 100. The control set 130 is for controlling the cord 600 and for fixing the extension of the seat post as will be described below. The first pulley 110 can also include ring grooves for cord 600 to wind upon. The first pulley 110 is matched with a clamping wheel 112. Two slide members 101, a pivot through-hole 102, and a locating hole 103 are disposed at a bottom end of the adjusting tube 100.

The clamping wheel 112 includes a clamping ring 113 and two step wheels 114. The clamping ring 113 is pivotally disposed in the fixing head 120 of the adjusting tube 100. Each of the step wheels 114 has a smaller first step 115 and a larger second step 116. The two first steps 115 are disposed oppositely and can be sleeved and movable inside the clamping ring 113. Two periods of the cord 600 running opposite directions are deposed respectively between the second steps 116 and the clamping ring 113. An axle 117 fixes the clamping ring 113 on a seat member 121 in the fixing head. A pressing member 111 for clamping or releasing the cord 600 is matched with the clamping ring 113. The pressing member 111 can press and move the step wheel 114 axially, so that the second steps 116 and the clamping ring 113 can clamp the cord 600, and the two periods of the cord 600 running opposite directions is fixing the cord 600. The control set 130 is pivotally disposed at the end of the pressing member 111. A cam 131 is disposed at the end of the control set 130 to drive the pressing member 111 moving axially with an axial displacement. A spring 140 as a resetting means is disposed between the fixing head 120 and the pressing member 111, for resetting the control set 130 and the pressing member 111 to predetermined locations.

The pushing member 200 has a first end 210 and a second end 220. When the seat post is installed on the bicycle, the first end 210 of the pushing member 200 is farther from the bicycle frame then the second end 220. A locating member 211 is pivotally connected to the first end 210. A threaded through hole 221 is at the second end 220 of the pushing member 200. In order from the first end 210 to the second end 220 of the pushing member 200, the pushing member 200 includes a first track 230, a pivot space 240, and a second track 250. First long sliding holes 231 are opened on two sides of the first track 230. Second long sliding holes 251 are opened on two sides of the second track 250.

The main tube 300 is fixed with the second end 220 of the pushing member. A locating bolt 301 is disposed in the threaded through hole 221 of the second end 220 of the pushing member 200. The sliding member 101 of the adjusting tube 100 can only slide along a sliding path 302 on sides of the main tube 300, so that the adjusting tube 100 can be only moved axially up and down along the main tube 300. The main tube 300 is to be installed and fixed on the bicycle.

In order from top to down, the adjusting mechanism 400 includes a second pulley 410, a third pulley 420, and a fourth pulley 430. The second pulley 410 with a sliding seat 411 is pivotally disposed in the first long sliding hole 231 of the pushing member 200. So the second pulley 410 is limited by the first long sliding hole 231. By sliding along the first long sliding hole 231, the second pulley 410 can only be moved axially along the pushing member 200 with a base displacement X relative to the first pulley 110 of the adjusting tube 100. The third pulley 420 is pivotally disposed in the pivot space 240 of the pushing member 200. The fourth pulley 430 with a pivot rod 431 and a locating rod 432 is pivotally disposed in the second long sliding hole 251 of the pushing member 200. The pivot rod 431 and the locating cod 432 respectively fix the fourth pulley 430 at the pivot through-hole 102 and the penetrated locating hole 103 of the adjusting tube 100. Limited by the second long slide hole 251 of the pushing member 200, the fourth pulley 430 is axially movable along the pushing member 200 with a feed displacement Y relative to the second end 220 of the pushing member 200. Please refer to FIG. 2 to see detailed illustration for the base displacement X and the feed displacement Y as mentioned above.

The elastic member 500 is connected between the locating member 211 of the pushing member 200 and the sliding seat 411 of the second pulley 410. The elastic member 500 pushing the pushing member 200 can move the second end 220 of the pushing member 200 outwardly from the adjusting tube 100.

The cord 600 includes a base segment 610 and a feed segment 620. The base segment 610 is wound around the first pulley 110 and the second pulley 410. The feed segment 620 is wound around the third pulley 420 and the fourth pulley 430. Winding turns of the feed segment 620 is more then winding turns of the base segment 610. So the extension of the adjusting tube from the main tube can be adjusted by the feed displacement Y; the feed displacement Y over base displacement X ratio can be adjusted by the winding turns of feed segment 620 and the winding turns of base segment 610; the base displacement X depends on how much the adjusting tube 100 been pressed into the main tube 300 or how much the adjusting tube 100 been pushed out of the main tube 300 by the elastic member 500 pushing the pushing member 200. To adjust the winding turns of the base segment 610 and the winding turns of the feed segment 620 can achieve the proper and designed extension length without demanding the elastic force of the elastic member 500 too much.

Figure 6:
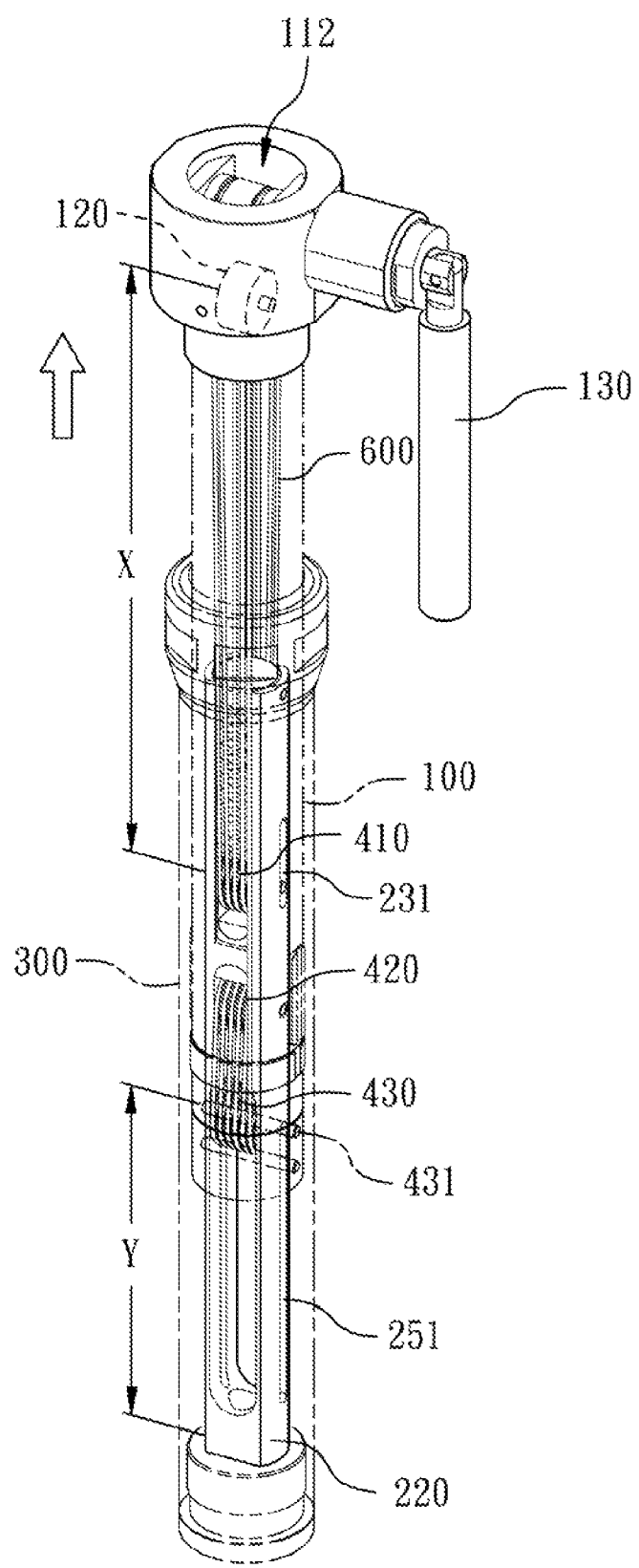
FIG. 6 shows the seat post in the state of extending outwardly of an embodiment of the present disclosure.
Figure 7:
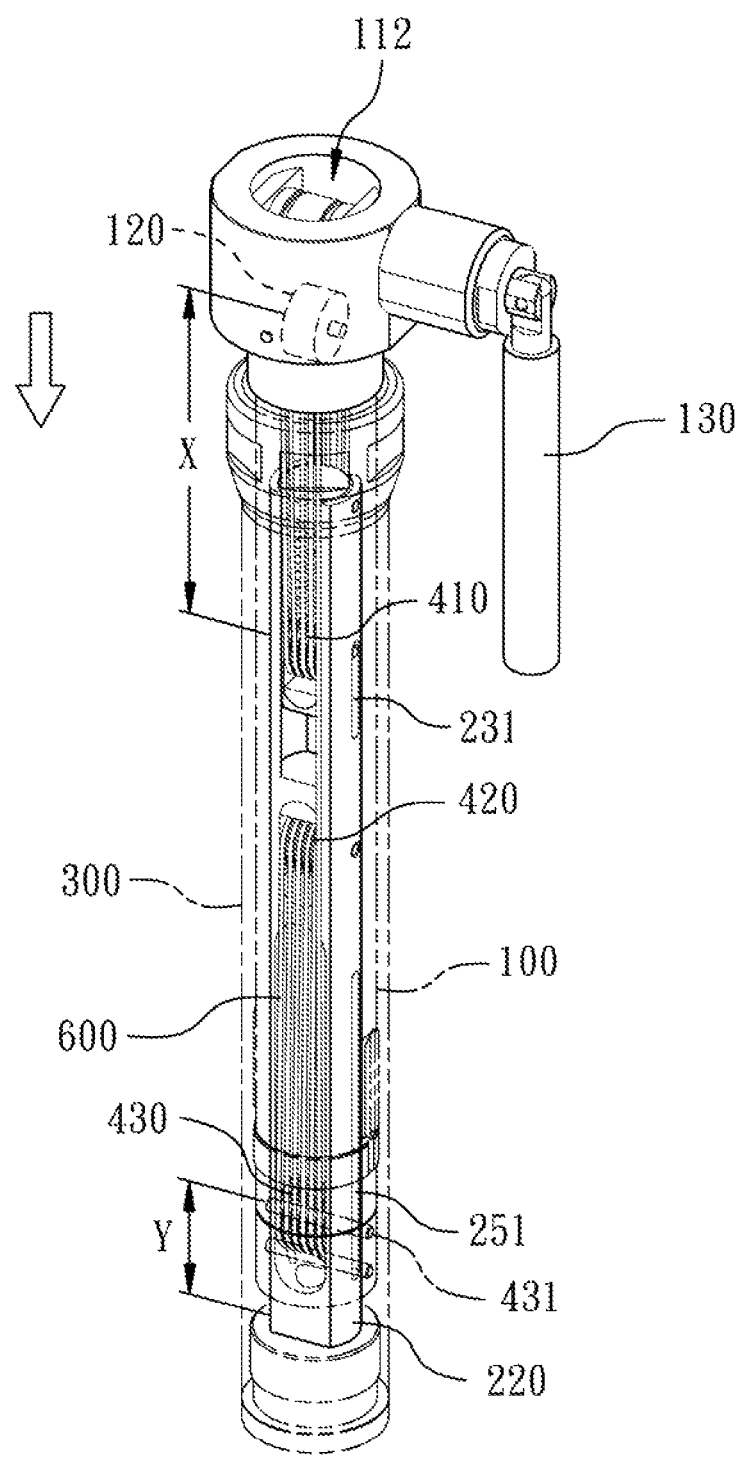
FIG. 7 shows the seat post in the state of extending inwardly of an embodiment of the present disclosure.

FIG. 6 and FIG. 7 show the operation of present seat post. FIG. 6 shows the seat post in the state of extending outwardly, and FIG. 7 shows the seat post in the state of extending inwardly. Please also see FIGS. 4A and 4B for the details of the fixing head assembly.

The embodiment of present disclosure can include the pressing member 111 to clamp the cord 600. The pressing member 111 pushes the step wheel 114 to make the second step 116 and the clamping ring 113 clamp the cord 600. At this time, two periods of the cord 600 running opposite directions are clamped in the same clamping mechanism, so the two periods of the cord 600 can move toward neither direction, thus the cord 600 is clamped and fixed. Because the cord 600 is fixed, the base segment 610 and the feed segment 620 of the cord 600 are fixed, the base displacement X and the feed displacement Y are also fixed. At this time, the seat post according to this embodiment is fixed at a predetermined position with a predetermined length; in other words the saddle height of the bicycle is fixed.

The embodiment of present disclosure can also not include the pressing member 111, so the cord 600 can maintain in moving condition. Because the elastic member 500 is connected between the locating member 211 of the pushing member 200 and the sliding seat 411 of the second pulley 410, the elastic member 500 pushing the second pulley 410 can increase the base displacement X between the second pulley 410 and the first pulley 110 of the adjusting tube 100, and the base segment 610 of the cord 600 between the first pulley 110 and the second pulley 410 grows longer. The feed displacement Y of the cord 600 between the fourth pulley 430 and the pushing member 200 becomes shorter accordingly. As a result, the feed segment 620 of the cord 600 wound around the third pulley 420 and the fourth pulley 430 supplies part of its length to the base segment 610. Because the third pulley 420 is pivotally disposed in the pivot space 240 of the pushing member 200, and the fourth it) pulley 430 is pivotally fixed at the adjusting tube 100 by the pivot rod 431 and the locating cod 432, the third pulley 420 would drive the pushing member 200 extending outwardly from adjusting tube 100. Furthermore, the second end 220 of the pushing member 200 is fixed at the bottom of the main tube 300, so when the third pulley 420 driving the pushing member 200 extending outwardly from adjusting tube 100, it is actually the adjusting tube 100 being pushed up outwardly from the main tube 100, and the saddle height of the bicycle is adjusted to higher. Moreover, the winding turns of feed segment 620 can be more then the winding turns of base segment 610. As a result, the amount of the feed displacement Y compared to the base displacement X can be correspondingly adjusted. The contraction amount of the elastic member 500 can be correspondingly adjusted as well. Therefore, the elastic member 500 can be change to a weaker or lighter elastic member to produce a sufficient extension length.

On the other hand, when the embodiment does not include the pressing member 111, the rider can also put his/her weight on the seat post to lower the seat post. The rider's body weight can compress the elastic member 500. So the base displacement X between second pulley 410 and the first pulley 110 of the adjusting tube 100 is decreased. The base segment 610 of the cord 600 between the first pulley 110 and the second pulley 410 grows shorter, and the feed displacement Y of the cord 600 between the fourth pulley 430 and the pushing member 200 becomes longer accordingly. As a result, the feed segment 620 of the cord 600 wound around the third pulley 420 and the fourth pulley 430 gets more length from the base segment 610. And the adjusting tube 100 can be lowered to a predetermined position relative to the main tube 300.

This embodiment can also include the pressing member 111. A user can operate the pressing member 111 to clamp the cord 600 to fix the saddle height whenever the seat post is lowered or raised to the desired saddle height.

An adjusting method for a seat post of a bicycle according to the present disclosure is now described as below with reference to FIGS. 4A and 4B, which illustrate the front and side cross-sectional view of a fixing head 120 assembly, and FIGS. 5A and 5B, which illustrate the front and side cross-sectional view of a pushing member 200 assembly. A main tube 300, a pushing member 200, and an adjusting tube 100 are provided to enable the seat post stretching. A first pulley 110, a second pulley 410, a third pulley, and a fourth pulley 430 with a base displacement X and a feed displacement Y are provided and assembled, in which the plurality of pulleys are wound around by a cord 600 (please also refer to FIG. 6). An elastic member 500 is provided for a resetting force to reset the cord 600. The number of winding turns at the feed displacement and the number of winding turns at the base displacement are different, so that changing in the base displacement X can cause changing in the feed displacement Y. The feed displacement Y and the base displacement X are different, the difference between the feed displacement Y and base displacement X can cause the third pulley 420 pushing the pushing member 200 to extend the adjusting tube 100 from the main tube 300. The cord 600 can be reset by the resetting force of the elastic member 500. The base displacement X can therefore be reset to a predetermined amount. The adjusting tube 300 can be reset to a predetermined position relative to the main tube 300.

According to above present disclosure, a mechanical system for a stretchable seat post is provided and free from complicated hydraulic mechanism. Simply by pulleys, elastic member, and a cord, the seat post length can be adjusted. Furthermore, the feed displacement Y and the base displacement X can be adjusted depend on design. And the seat post adjusting speed and adjusting height can be designed too, through adjusting the number of winding turns of the feed segment and base segment.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fail within the scope of the following claims.

What is claimed is:
1. A seat post of a bicycle, comprising:
an adjusting tube;
a first pulley pivotally disposed in the adjusting tube;
a pushing member having a first end and a second end, wherein the first end of the pushing member is coaxially disposed in the adjusting tube;

a main tube connected to the bicycle, wherein the second end of the pushing member is connected to the main tube, and the adjusting tube is axially movable in the main tube;

an adjusting mechanism comprising, in order from the first end to the second end of the pushing member:
- a second pulley pivotally connected to the pushing member and being axially movable along the pushing member;
- a third pulley pivotally connected to the pushing member; and
- a fourth pulley pivotally and coaxially connected to the pushing member and the adjusting tube;

an elastic member connected to the adjusting mechanism; and a cord comprising:
- a base segment wound around the first pulley and the second pulley; and
- a feed segment wound around the third pulley and the fourth pulley;

wherein the second end of the pushing member is movable outwardly from the adjusting tube by the elastic member pushing the adjusting mechanism, so that the second pulley is axially movable with a base displacement relative to the adjusting tube, and the fourth pulley is axially movable along the pushing member with a feed displacement.

2. The seat post of the bicycle of claim 1, further comprising:
a clamping wheel clamping the cord axially, wherein two periods of the base segment of the cord running in opposite directions are wound around the clamping wheel, and the rest of the base segment of the cord is would around the first pulley.

3. The seat post of the bicycle of claim 2, further comprising a fixing head fixed at a top end of the adjusting tube, the clamping wheel further comprising:
a clamping ring pivotally disposed in the fixing head;
two step wheels, each of the step wheels has a smaller first step and a larger second step, wherein the two first steps are disposed oppositely and sleeved inside the clamping ring, wherein the two periods of the base segment of the cord running opposite directions are deposed between the second steps respectively and the clamping ring; and
a pressing member axially moving one of the step wheels, so that the second steps and the clamping ring clamp the cord.

4. The seat post of the bicycle of claim 3, further comprising:
a control set moving the pressing member with an axial displacement; and
a resetting means for resetting the control set to a predetermined location.

5. The seat post of the bicycle of claim 1, wherein a number of winding turns of the feed segment and a number of winding turns of the base segment are different.

6. The seat post of the bicycle of claim 1, wherein the base displacement and the feed displacement are different.

7. The seat post of the bicycle of claim 1, wherein each of the two ends of the elastic member respectively pushes the first end of the pushing member and the second pulley.

8. The seat post of the bicycle of claim 1, wherein each of the two ends of the elastic member respectively pushes the first pulley and the second pulley.

9. The seat post of the bicycle of claim 1, wherein each of the two ends of the elastic member respectively pushes the second end of the pushing member and the fourth pulley.

10. An adjusting method for a seat post of a bicycle, comprising:
disposing a plurality of pulleys in a stretchable seat post to produce a base displacement and a feed displacement, wherein at least one of the pulleys is moved correspondently with the seat post;
winding a cord around the plurality of pulleys, wherein a number of winding turns at the feed displacement and a number of winding turns at the base displacement are different, so that when the cord is applied force and the base displacement is changed, the feed displacement is different from the base displacement, and the seat post is stretched outwardly or inwardly accordingly; and
applying an elastic resetting force for resetting the base displacement and resetting the seat post stretching.

* * * * *